(12) United States Patent
Cudak et al.

(10) Patent No.: US 9,744,442 B2
(45) Date of Patent: Aug. 29, 2017

(54) DYNAMIC QUALITY OF SERVICE MANAGEMENT IN MULTIPLAYER GAMING

(75) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 727 days.

(21) Appl. No.: 13/596,022

(22) Filed: Aug. 27, 2012

(65) Prior Publication Data

US 2014/0057723 A1    Feb. 27, 2014

(51) Int. Cl.
*A63F 13/12*    (2006.01)
*A63F 13/30*    (2014.01)

(52) U.S. Cl.
CPC ........ *A63F 13/12* (2013.01); *A63F 2300/407* (2013.01); *A63F 2300/534* (2013.01)

(58) Field of Classification Search
CPC ....................................................... A63F 13/12
See application file for complete search history.

(56) References Cited

U.S. PATENT DOCUMENTS

2004/0230695 A1* 11/2004 Anschutz et al. ............ 709/232
2008/0318685 A9   12/2008 Oak et al.
2009/0067328 A1    3/2009 Morris et al.
2009/0192981 A1    7/2009 Papaemmanouil et al.
2011/0246665 A1   10/2011 Vange et al.

FOREIGN PATENT DOCUMENTS

WO    WO2007016032    2/2007

OTHER PUBLICATIONS

Sinha, et al, "Network game traffic—A broadband access perspective", Computer Networks, May 2005.

* cited by examiner

*Primary Examiner* — Kang Hu
*Assistant Examiner* — Thomas H Henry
(74) *Attorney, Agent, or Firm* — Steven M. Greenberg, Esq.; CRGO Law

(57) ABSTRACT

Embodiments of the present invention provide a method, system and computer program product for dynamic quality of service (QoS) management for multi-player gaming. In an embodiment of the invention, a method for dynamic QoS management for multi-player gaming is provided. The method includes monitoring a multi-player game and detecting a game moment for a game player in the multi-player game. The method also includes determining a degree of sensitivity for the game moment and enhancing access to a computing resource of the game player in response to determining the game moment to be highly sensitive. In one aspect of the embodiment, the method additionally includes detecting a subsequent game moment for the game player in the multi-player game, determining a degree of sensitivity for the subsequent game moment, and reducing access to the computing resource of the game player in response to determining the game moment to be less sensitive.

14 Claims, 1 Drawing Sheet

DYNAMIC QUALITY OF SERVICE MANAGEMENT IN MULTIPLAYER GAMING

BACKGROUND OF THE INVENTION

Field of the Invention

The present invention relates to multiplayer gaming and more particularly to resource consumption in multiplayer gaming.

Description of the Related Art

A multiplayer video game is one which multiple players can concurrently play a game within the same gaming environment. While single player games which have dominated computer gaming pit a single player against one or more automated opponents engaging in pre-programmatic behavior, multiplayer games pit different individuals against one another, each being limited to dynamic, on the fly behavior limited by the power of human thinking. Multiplayer games also often provide a game environment in which different players engage in allied competition against other players whether human or computer automated. In the latter instance, cooperative multiplayer gaming environments reflect a 21st century version of the role playing board games of the 20th century.

Technologically, multiplayer gaming environments can be supported within a single gaming console, or in a distributed fashion over a computer communications network. In fact, some relatively recent multiplayer gaming environments are supported by geographically remote players communicatively connected to one another over the Internet through gaming consoles, personal computers, smart phone, personal digital assistants, or any combination thereof. However, in all instances, the virtual world in which the multiple players interact must remain consistent for all players.

In massively multi-player games, network communications bandwidth can be of real concern—particularly as a game scales in participation to thousands of simultaneous players per server. Yet, at any given time, not all players in a massively multi-player game participate in a game activity that requires the same rate of data transmission over the Internet due to varying sensitivity of a game moment experienced by each of their respective characters. Rather, players engaged in a highly sensitive game moment of a massively multi-player game may require increased resource consumption such as higher network bandwidth, whilst players engaged in a low sensitivity game moment may require only a minimum of resource consumption.

In this regard, highly sensitive game moments of a massively multi-player game include when an "enemy" or "opposing player" becomes virtually proximate in virtual portion of a virtual world requiring an action on behalf of the player. Another highly sensitive game moment can include when different players coordinate with one another in a group activity such as a "a group raid" which involves excellent timing and coordination. As yet another example of a highly sensitive game moment, a character of a player may enter a virtual portion of a virtual world rife with traps or active elements able to endanger the character. In contrast, a low sensitivity moment may include a character merely casually moving about in a virtual portion of a virtual world lacking a density of traps or active elements.

BRIEF SUMMARY OF THE INVENTION

Embodiments of the present invention address deficiencies of the art in respect to multi-player gaming and provide a novel and non-obvious method, system and computer program product for dynamic quality of service (QoS) management for multi-player gaming. In an embodiment of the invention, a method for dynamic QoS management for multi-player gaming is provided. The method includes monitoring a multi-player game and detecting a game moment for a game player in the multi-player game. The method also includes determining a degree of sensitivity for the game moment and enhancing access to a computing resource of the game player in response to determining the game moment to be highly sensitive. In one aspect of the embodiment, the method additionally includes detecting a subsequent game moment for the game player in the multi-player game, determining a degree of sensitivity for the subsequent game moment, and reducing access to the computing resource of the game player in response to determining the game moment to be less sensitive.

In another embodiment of the invention, a multi-player gaming system is configured for dynamic QoS management. The system includes a host computing system that includes at least one computer with memory and at least one processor and a game server executing in the memory of the host computing system and sustaining a multi-player game in which different players play from different computers over a computer communications network. The system also includes a QoS management module executing in memory of a computer and monitoring the multi-player game. The module includes computer program code enabled during execution in the memory of the computer to detect a game moment for a game player in the multi-player game, to determine a degree of sensitivity for the game moment, and to enhance access to a computing resource of the game player in response to determining the game moment to be highly sensitive. In this regard, in one aspect of the embodiment, the game moment is determined to be highly sensitive when the game player is poised to engage in a coordinated attack. In another aspect of the embodiment, the game moment is determined to be highly sensitive when the game player is in proximity of an enemy.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamic QoS management for multi-player gaming. In accordance with an embodiment of the invention, a multi-player game can be established in memory of a host computing system communicatively coupling together different players corresponding to respectively different characters in the multi-player game. One or more different highly sensitive game moments can be defined for the multi-player game. Thereafter, as a character approaches a highly sensitive game moment in the multi-player game, access to a computing resource to support the activities of the character can be enhanced. For example, additional memory can be allocated for use in supporting the activities of the character, increased processor usage can be allocated for use in supporting the activities of the character, or increased network bandwidth can be allocated for use in supporting the activities of the character. Conversely, when a character is not determined to be in or approaching a highly sensitive game moment, access to computing resources can be reduced. In this way, the QoS in the multi-player game for different players can vary according to the activities of the corresponding characters in the multi-player game.

Figure 1:
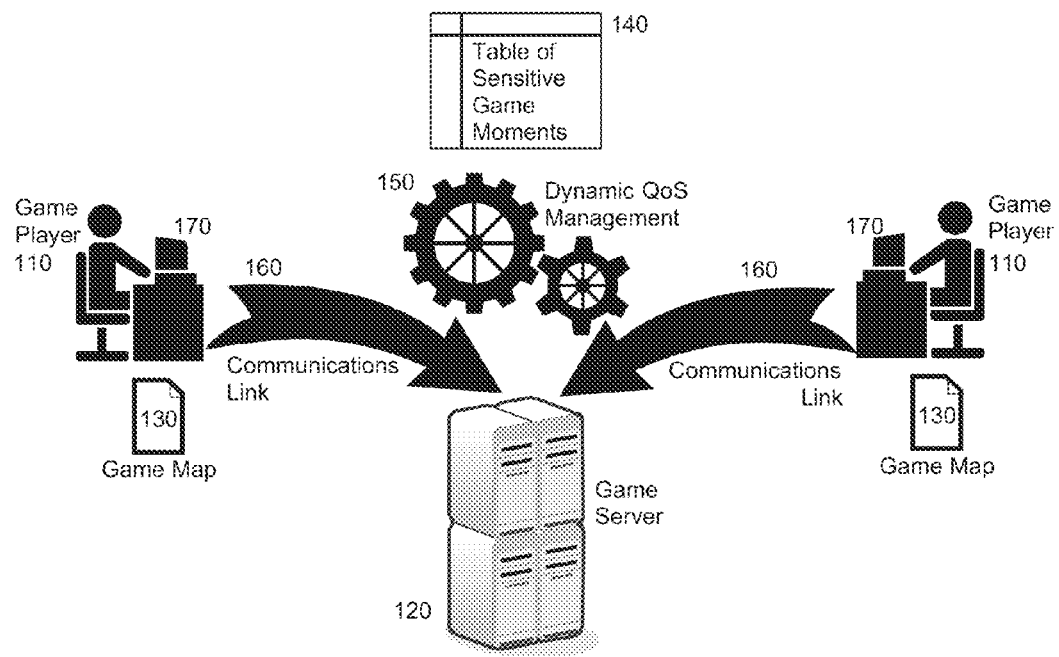
FIG. 1 is a pictorial illustration of a process for dynamic QoS management for multi-player gaming.

In further illustration, FIG. 1 is a pictorial illustration of a process for dynamic QoS management for multi-player gaming. As shown in FIG. 1, different game players 110 through respective computers 170 and communications links 160 a multi-player game hosted by a game server 120. The participation of each game player 110 in the multi-player game can be regulated according to a corresponding game map 130 which provides a visualization to the corresponding game player 110 of the location and movement of the game player 110 in the multi-player game. Of note, the ability of game players 110 to individually perform optimally in the multi-player game can depend upon access to computing resources provided to the game players 110 at any given time, including access to bandwidth in the communications links 160, access to memory and processor resources in either the computers 170 or the game server 120, and the responsiveness of the game server 120 to the requests of the game players 110.

Dynamic QoS management logic 150 can manage the access to computing resources provided to the game players 110. In this regard, the QoS management logic 150 can refer to the movements of the game players 110 in the multi-player game and can compare different moments for each of the different game players 110 in the multi-player game to entries in a table of game sensitive moments 140. The table of game sensitive moments 140 can include an aggregation of pre-determined game moments of high sensitivity. To the extent that a particular game player 110 is determined to contemporaneously experience a game moment of high sensitivity, the dynamic QoS management logic 150 can provide enhanced access to computing resources for the game player 110, such as enhanced bandwidth, increased memory or processing cycles, or priorities responsiveness in the game server 120 to requests from the game player 110. Conversely, the extent that a particular game player 110 is determined not to contemporaneously experience a game moment of high sensitivity, the dynamic QoS management logic 150 can provide reduced access to computing resources for the game player 110.

Figure 2:
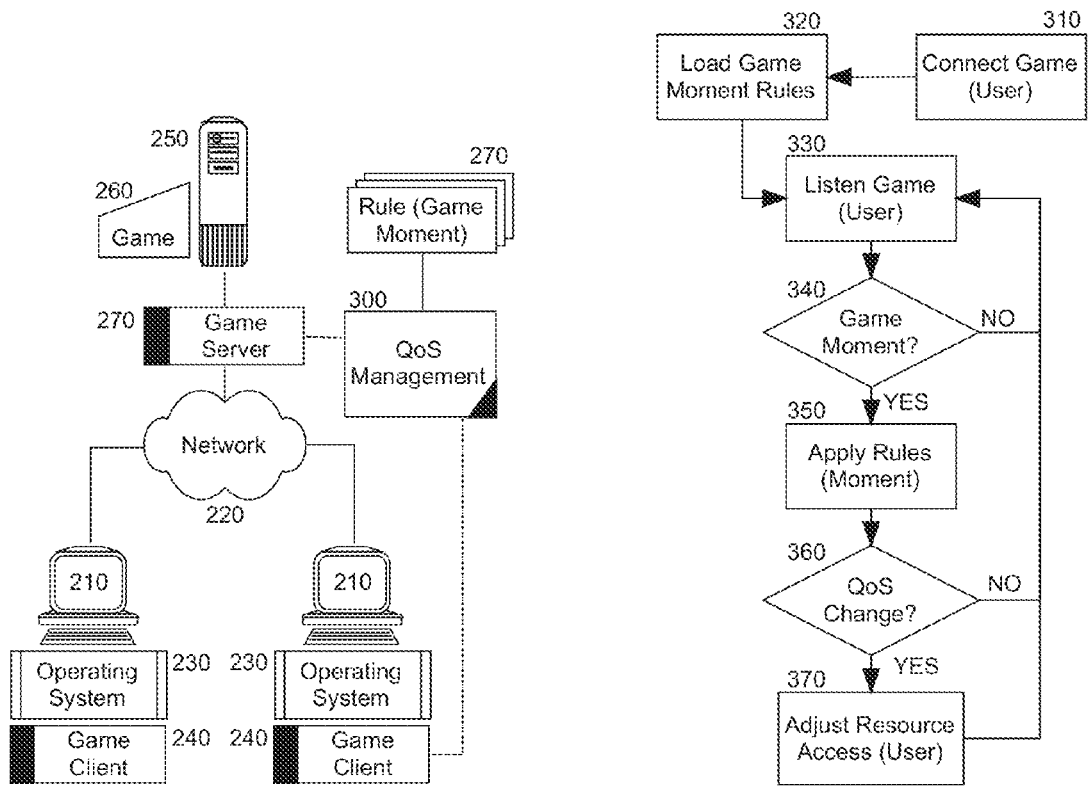
FIG. 2 is a schematic illustration of a multi-player gaming data processing system configured for dynamic QoS management; and, FIG. 3 is a flow chart illustrating a process for dynamic QoS management for multi-player gaming.

The process described in connection with FIG. 1 can be implemented in a multi-player data processing system. In yet further illustration, FIG. 2 schematically shows a multi-player gaming data processing system configured for dynamic QoS management. The system can include a host computing system 250 that includes one or more computers each with memory and at least one processor. The host computing system 250 can support the operation of a game server 270 configured to generate and manage a multi-player game 260 in which different game players interact collaboratively or adversely as the case may be. In this regard, different client computers 210 can be communicatively coupled to the game sever 270 over computer communications network 220, each hosting an operating system 230 supporting the execution of a game client 240 through which a respective one of the game players interacts with others of the game players in the multi-player game 260.

Importantly, a QoS management module 300 can be coupled to either or both of the game server 270 and one or more of the game clients 240. The QoS management module 300 can include program code that when executed in memory of a computer can be enabled to monitor game moments for respectively different game players in the multi-player game 260 to determine whether or not the game moments are of high sensitivity. Upon determining a given game moment for a game player is highly sensitive, the program code of the QoS management module 300 can be enabled to apply one or more rules 270 to enhance access to computing resources for the game player—for example, by enhancing network bandwidth available to the game player, by prioritizing data transmitted to and from the game player, by increasing memory available to the game player either within a corresponding one of the client computers 210 or in the host computing system 270, by increasing central processor unit (CPU) cycles available to the game player either within a corresponding one of the client computers 210 or in the host computing system 270, or by prioritizing request handling in the game server 270 for requests from the game player.

Figure 3:
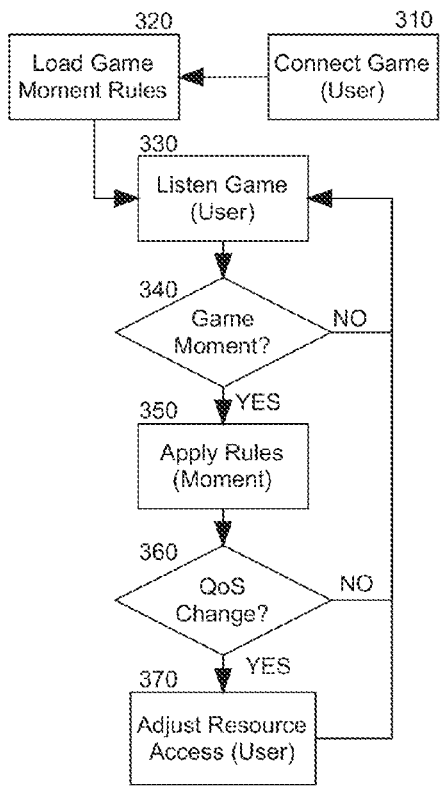

In even yet further illustration of the operation of the QoS management module 300, FIG. 3 is a flow chart illustrating a process for dynamic QoS management for multi-player gaming. Beginning in block 310, a programmatic link can be established with a game hosted by the game server on behalf of one or more game players. In block 320, one or more game moment rules can be loaded into memory each indicating a resource modification that is to result in consequence of a detected game moment of a particular sensitivity. Optionally, the rules additionally can provide a manner in which to determine a degree of sensitivity for a game moment. For instance, a table can be consulted mapping game moments to a particular degree of sensitivity. As another example, a table can be consulted mapping a game moment to a specific modification of a specific resource for the benefit of the game players implicated by the game moment.

In block 330, the events of the game can be monitored to detect a game moment. In decision block 340, if a game moment is detected, in block 350 one or more of the rules can be applied to the moment. In particular, the rules can specify whether or not the detected game moment warrants an adjustment to one or more resources for the implicated game players. Alternatively, the rules can first rate the game moment to specify a degree of sensitivity and then, if the degree of sensitivity warrants, the rules can specify an adjustment to one or more resources for the implicated game players. In decision block 360, if the application of the rules provide that an adjustment to one or more resources for the implicated game players is warranted, in block 370 those resources can be adjusted. Thereafter, the process can return to block 330.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A computer-implemented method for dynamic quality of service (QoS) management for multi-player computer gaming, the method comprising:
    monitoring a multi-player computer game hosed by a game server;
    detecting a game moment for one of several different game players in the multi-player game;
    determining a degree of sensitivity for the game moment; and,
    enhancing access of the one of several game players to a computing resource, but not to others of the game players, in response to determining the game moment to be highly sensitive.

2. The method of claim 1, further comprising:
    detecting a subsequent game moment for the one of the several different game players in the multi-player game;
    determining a degree of sensitivity for the subsequent game moment; and,
    reducing access of the one of several game players to the computing resource, but not to others of the game players, in response to determining the subsequent game moment to be less sensitive.

3. The method of claim 1, wherein the game moment is determined to be highly sensitive when the game player is poised to engage in a coordinated attack.

4. The method of claim 1, wherein the game moment is determined to be highly sensitive when the game player is in proximity of an enemy.

5. The method of claim 1, wherein the resource is communications bandwidth.

6. The method of claim 1, wherein the resource is memory.

7. The method of claim 1, wherein the resource is central processing unit (CPU) access.

8. A multi-player gaming system configured for dynamic quality of service (QoS) management comprising:
    a host computing system comprising at least one computer with memory and at least one processor;
    a game server executing in the memory of the host computing system and sustaining a multi-player game in which different players play from different computers over a computer communications network; and,
    a QoS management module executing in memory of a computer and monitoring the multi-player game, the module comprising computer program code enabled during execution in the memory of the computer to detect a game moment for one of several different game players in the multi-player game, to determine a degree of sensitivity for the game moment, and to enhance access of the one of several game players to a computing resource, but not to others of the game players, in response to determining the game moment to be highly sensitive.

9. The system of claim 8, wherein the computer program code is further enabled to:
    detect a subsequent game moment for the one of the several different game players in the multi-player game;
    determine a degree of sensitivity for the subsequent game moment; and,
    reduce access of the one of several game players to the computing resource, but not to others of the game players, in response to determining the subsequent game moment to be less sensitive.

10. The system of claim 8, wherein the game moment is determined to be highly sensitive when the game player is poised to engage in a coordinated attack.

11. The system of claim 8, wherein the game moment is determined to be highly sensitive when the game player is in proximity of an enemy.

12. The system of claim 8, wherein the resource is communications bandwidth.

13. The system of claim 8, wherein the resource is memory.

14. The system of claim 8, wherein the resource is central processing unit (CPU) access.

* * * * *